(12) United States Patent
Lee et al.

(10) Patent No.: US 9,293,091 B2
(45) Date of Patent: Mar. 22, 2016

(54) DISPLAY APPARATUS AND METHOD FOR DRIVING THE SAME

(71) Applicant: Samsung Display Co., LTD., Yongin, Gyeonggi-Do (KR)

(72) Inventors: Kwang-Keun Lee, Osan-si (KR); Hae-Il Park, Seoul (KR); Seon-Tae Yoon, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/456,378

(22) Filed: Aug. 11, 2014

(65) Prior Publication Data

US 2015/0228232 A1 Aug. 13, 2015

(30) Foreign Application Priority Data

Feb. 11, 2014 (KR) .................. 10-2014-0015190

(51) Int. Cl.
*G09G 3/36* (2006.01)
*G02F 1/1335* (2006.01)
(Continued)

(52) U.S. Cl.
CPC ........ *G09G 3/3607* (2013.01); *G02F 1/133514* (2013.01); *G02F 1/133603* (2013.01); *G02F 1/133617* (2013.01); *G02F 1/134309* (2013.01); *G09G 3/3413* (2013.01); *G02F 2001/133613* (2013.01); *G02F 2001/133614* (2013.01); *G02F 2001/134345* (2013.01); *G09G 2320/0271* (2013.01)

(58) Field of Classification Search
CPC .............. G02F 1/133603; G02F 1/133617; G02F 2001/133614; G02F 1/133621; G02F 1/13362; G02F 1/133514; G09G 2310/0297; G09G 2310/04; G09G 2310/06; G09G 2310/061; G09G 2310/062; G09G 2310/063; G09G 2310/066; G09G 2310/067; G09G 2310/08; G09G 3/3607; G09G 3/367
USPC .......................... 349/71; 345/88, 690, 90, 89
See application file for complete search history.

(56) References Cited

U.S. PATENT DOCUMENTS

| 6,295,106 | B1 * | 9/2001 | Fukuzawa et al. ............... 349/71 |
| 7,750,984 | B2 | 7/2010 | Ha et al. |
| 8,277,064 | B2 | 10/2012 | Willemsen et al. |

(Continued)

FOREIGN PATENT DOCUMENTS

| JP | 2007-206585 A | 8/2007 |
| KR | 1020070002452 A | 1/2007 |

(Continued)

*Primary Examiner* — Jason Olson
*Assistant Examiner* — Deeprose Subedi
(74) *Attorney, Agent, or Firm* — Cantor Colburn LLP

(57) ABSTRACT

A display apparatus includes: a display panel including first to third sub pixels which receive a first grayscale data, a second grayscale data and a third grayscale data, respectively; a light source part which provides light to the display panel and sequentially turns on first and second light sources, which emit a first light and a second light having a color different from the first light, respectively; and a color conversion layer including a first photoluminescence part which is excited by the first light to emit light having a first primary color, a second photoluminescence part which is excited by the first light to emit light having a second primary color, and a third photoluminescence part which is excited by the first light to emit light having a third primary color, where the first to third photoluminescence parts overlap the first to third sub pixels, respectively.

19 Claims, 10 Drawing Sheets

(51) Int. Cl.
  *G02F 1/1343*  (2006.01)
  *G09G 3/34*  (2006.01)

(56) References Cited

U.S. PATENT DOCUMENTS

| | | | |
|---|---|---|---|
| 2006/0244367 A1* | 11/2006 | Im et al. ........................ | 313/503 |
| 2007/0058107 A1* | 3/2007 | Im et al. ........................ | 349/71 |
| 2012/0274882 A1* | 11/2012 | Jung ............................... | 349/96 |
| 2012/0281155 A1 | 11/2012 | Takano | |
| 2012/0287381 A1* | 11/2012 | Li et al. ........................ | 349/106 |
| 2012/0293563 A1* | 11/2012 | Akimoto et al. .............. | 345/690 |
| 2012/0320270 A1* | 12/2012 | Takata ........................... | 348/554 |
| 2012/0327683 A1* | 12/2012 | Yee ................................ | 362/602 |
| 2013/0027445 A1* | 1/2013 | Tsai et al. ...................... | 345/696 |
| 2013/0088469 A1* | 4/2013 | Yee ................................ | 345/207 |
| 2013/0113847 A1* | 5/2013 | Mori et al. ..................... | 345/690 |
| 2014/0176857 A1* | 6/2014 | Chen et al. ..................... | 349/61 |
| 2015/0131029 A1* | 5/2015 | Kaida et al. .................... | 349/69 |

FOREIGN PATENT DOCUMENTS

| | | |
|---|---|---|
| KR | 10-0965253 B1 | 6/2010 |
| KR | 10-1246717 A | 3/2013 |

* cited by examiner

DISPLAY APPARATUS AND METHOD FOR DRIVING THE SAME

This application claims priority to Korean Patent Application No. 10-2014-0015190, filed on Feb. 11, 2014, and all the benefits accruing therefrom under 35 U.S.C. §119, the content of which in its entirety is herein incorporated by reference.

BACKGROUND

1. Field

Exemplary embodiments of the invention relate to a display apparatus and a method for driving the display apparatus. More particularly, exemplary embodiments of the invention relate to a display apparatus with improved display quality and a method for driving the display apparatus.

2. Description of the Related Art

Generally, a liquid crystal display ("LCD") apparatus displays a multi-color image or full-color image in a color filter method. In the color filter method, white light emitted by a backlight unit passes through three color-filters which are spatially divided to generate a color light.

In the color filter method, since each color filter of the color filters may transmit light having a wavelength corresponding to a color thereof, only about ⅓ of the white light may be used for displaying an image, such that light loss ratio may increase.

A photoluminescence liquid crystal display apparatus including a color conversion layer may be used to decrease the light loss ratio. The color conversion layer may use phosphors or quantum dot. The photoluminescence LCD apparatus may include the phosphors or the quantum dot which are disposed on a front substrate. The photoluminescence LCD apparatus may use a blue colored light, an ultra violet ("UV") light or the like as a light source. The photoluminescence LCD apparatus may be excited by the specific light and emit an excitation light.

When the photoluminescence LCD apparatus uses the UV light as a light source, the UV light may be partially absorbed into a liquid crystal ("LC") layer. Thus, an energy of the UV light, which is used for excitation of the phosphors of the quantum dot, may decrease. In addition, the LC layer may have a shortened span of life as being degraded by the absorbed UV light. Accordingly, the photoluminescence LCD apparatus may use a blue light source that emits a blue colored light, and the color conversion layer may use a red or a green quantum dot or a red or green phosphors. Thus, the red and green phosphors (or quantum dots) are excited by the light emitted by the blue light source and emit red and green light from red and green pixel regions, respectively. Also, a blue light may be emitted by a transparent pixel region.

SUMMARY

In a photoluminescence liquid crystal display ("LCD") apparatus including a blue light source, when the photoluminescence LCD apparatus uses the blue light source and the color conversion layer include the red and green quantum dots (or phosphors), the red and green light emitted by the red and green quantum dots may have relatively low amount of light compared with the blue light emitted by the transparent pixel region. Thus, the colors displayed by the photoluminescence LCD apparatus may lose a balance between themselves, and display quality may decrease.

One or more exemplary embodiment of the invention provides a display apparatus with improved display quality.

One or more exemplary embodiment of the invention also provides a method for driving the display apparatus.

According to an exemplary embodiment, a display apparatus includes a display panel, a light source part and a color conversion layer. In such an embodiment, the display panel includes a first sub pixel configured to receive a first grayscale data, a second sub pixel configured to receive a second grayscale data, and a third sub pixel configured to receive a third grayscale data, the light source part is configured to provide light to the display panel and to sequentially turn on a first light source and a second light source, where the light source part includes the first light source configured to emit a first light and the second light source configured to emit a second light having a color different from the first light, and the color conversion layer includes a first photoluminescence part which overlaps the first sub pixel and is configured to be excited by the first light to emit a first excitation light having a first primary color, a second photoluminescence part which overlaps the second sub pixel and is configured to be excited by the first light to emit a second excitation light having a second primary color, and a third photoluminescence part which overlaps the third sub pixel and is configured to be excited by the first light to emit a third excitation light having a third primary color.

In an exemplary embodiment, a first maximum value of a frame may be defined as the greater of a maximum value of a first converted value corresponding to the first grayscale data during the frame and a maximum value of a second converted value corresponding to the second grayscale data during the frame. In such an embodiment, when the first maximum value of the frame is greater than an external quantum efficiency of the color conversion layer, the light source part may be configured to turn on the first light source during a first sub frame of the frame and to turn on the second light source during a second sub frame of the frame. In such an embodiment, when the first maximum value of the frame is less than or equal to the external quantum efficiency, the light source part may be configured to turn on the first light source during the first sub frame of the frame and to turn off the second light source during the second sub frame of the frame.

In an exemplary embodiment, the external quantum efficiency may be determined based on a ratio of a quantity of photons supplied to the color conversion layer to a quantity of photons emitted from the color conversion layer, the first converted value may be determined based on (a value of the first grayscale data/a maximum grayscale value)$^{2.2}$, the second converted value may be determined based on (a value of the second grayscale data/the maximum grayscale value)$^{2.2}$, and a third converted value may be determined based on (a value of the third grayscale data/the maximum grayscale value)$^{2.2}$.

In an exemplary embodiment, when the first maximum value of the frame is greater than the external quantum efficiency, the first sub pixel and the second sub pixel may be configured to receive the maximum grayscale value during the first sub frame of the frame.

In an exemplary embodiment, when the first maximum value of the frame is greater than the external quantum efficiency, the first sub pixel may be configured to receive a grayscale value corresponding to (the first converted value–the external quantum efficiency)/the first maximum value during the second sub frame of the frame, the second sub pixel may be configured to receive a grayscale value corresponding to (the second converted value–the external quantum efficiency)/the first maximum value during the second sub frame of the frame, and the third sub pixel may be configured to receive a minimum grayscale value during the second sub frame of the frame.

In an exemplary embodiment, when the first maximum value of the frame is less than or equal to the external quantum efficiency, the first sub pixel may be configured to receive a grayscale value corresponding to the first converted value divided by the external quantum efficiency during the first sub frame of the frame, and the second sub pixel may be configured to receive a grayscale value corresponding to the second converted value divided by the external quantum efficiency during the first sub frame of the frame.

In an exemplary embodiment, the color conversion layer may further include a light recycling layer disposed on the first photoluminescence part and the second photoluminescence part in a first direction and configured to reflect the third excitation light in a second direction opposite to the first direction, and a band pass filter disposed on the first photoluminescence part and the second photoluminescence part in the second direction and configured to reflect the first excitation light and the second excitation light in the first direction.

In an exemplary embodiment, the color conversion layer may further include a first color filter and a second color filter. In such an embodiment, the first color filter may be disposed on the first photoluminescence part in the first direction, and have the first primary color, and the second color filter may be disposed on the second photoluminescence part in the first direction, and have the second primary color.

In an exemplary embodiment, the display panel may be disposed between the color conversion layer and the light source part.

In an exemplary embodiment, the color conversion layer may be disposed between the display panel and the light source part.

In an exemplary embodiment, the first primary color may be red, the second primary color may be green, and the third primary color may be blue.

In an exemplary embodiment, the first light emitted by the first light source may have the third primary color, and the second light emitted by the second light source may have a yellow color.

In an exemplary embodiment, the first light emitted by the first light source may include a mixed light of light having the third primary color and ultra violet light, and the second light emitted by the second light source may have a yellow color.

In an exemplary embodiment, the first light emitted by the first light source may have the third primary color, and the second light emitted by the second light source may have one of the second primary color, a cyan color and a white color.

According to an exemplary embodiment, a method of driving a display apparatus includes: converting a first grayscale data, a second grayscale data and a third grayscale data to a first converted value, a second converted value and a third converted value, respectively, where a first sub pixel of the display apparatus receives the first grayscale data, a second sub pixel of the display apparatus receives the second grayscale data, and a third sub pixel of the display apparatus receives the third grayscale data; comparing a first maximum value of a frame and an external quantum efficiency of a color conversion layer, where the first maximum value of the frame is defined as the greater of a maximum value of the first converted value during the frame and a maximum value of the second converted value during the frame, and the color conversion layer is configured to emit excitation light; turning on a first light source configured to emit a first light during a first sub frame of the frame; and turning on a second light source during a second sub frame of the frame when the first maximum value of the frame is greater than the external quantum efficiency, and turning off the second light source during the second sub frame of the frame when the first maximum value of the frame is less than or equal to the external quantum efficiency, where the second light source is configured to emit a second light having a color different from a color of the first light.

In an exemplary embodiment, the method of driving a display apparatus may further include: applying a maximum grayscale value to the first sub pixel and the second sub pixel during the first sub frame of the frame, and applying the third grayscale data to the third sub pixel during the first sub frame of the frame, when the first maximum value of the frame is greater than the external quantum efficiency; and applying a grayscale value corresponding to the first converted value divided by the external quantum efficiency, to the first sub pixel during the first sub frame of the frame, applying a grayscale value corresponding to the second converted value divided by the external quantum efficiency, to the second sub pixel during the first sub frame of the frame, and applying the third grayscale data to the third sub pixel during the first sub frame of the frame, when the first maximum value of the frame is less than or equal to the external quantum efficiency.

In an exemplary embodiment, the method of driving a display apparatus may further include: applying a grayscale value corresponding to (the first converted value−the external quantum efficiency)/the first maximum value, to the first sub pixel during the second sub frame of the frame, applying a grayscale value corresponding to (the second converted value−the external quantum efficiency)/the first maximum value, to the second sub pixel during the second sub frame of the frame, and applying a minimum grayscale value to the third sub pixel during the second sub frame of the frame, when the first maximum value of the frame is greater than the external quantum efficiency; and applying the minimum grayscale value to the first sub pixel, the second sub pixel and the third sub pixel during the second sub frame of the frame, when the first maximum value of the frame is less than or equal to the external quantum efficiency.

In an exemplary embodiment, the external quantum efficiency may be determined based on a ratio of a quantity of photons supplied to the color conversion layer to a quantity of photons emitted from the color conversion layer. In such an embodiment, the first converted value determined by (a value of the first grayscale data/a maximum grayscale value)$^{2.2}$, and the second converted value may be determined by (a value of the second grayscale data/the maximum grayscale value)$^{2.2}$, and a third converted value may be determined by (a value of the third grayscale data/the maximum grayscale value)$^{2.2}$.

In an exemplary embodiment, the color conversion layer may include a first photoluminescence part, a second photoluminescence part and a third photoluminescence part. In such an embodiment, the first photoluminescence part may overlap the first sub pixel and be configured to be excited by the first light to emit a first excitation light having a first primary color, the second photoluminescence part may overlap the second sub pixel and be configured to be excited by the first light to emit a second excitation light having a second primary color, and the third photoluminescence part may overlap the third sub pixel and be configured to be excited by the first light to emit a third excitation light having a third primary color.

In an exemplary embodiment, the first primary color may be red, the second primary color may be green, the third primary color may be blue, the first light emitted by the first light source may have the third primary color, and the second light emitted by the second light source may have a yellow color.

In exemplary embodiments of the display apparatus and the method for driving the display apparatus as described herein, the display apparatus may sequentially drive light sources having colors different from each other. Thus, a display quality of the display apparatus may be improved

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
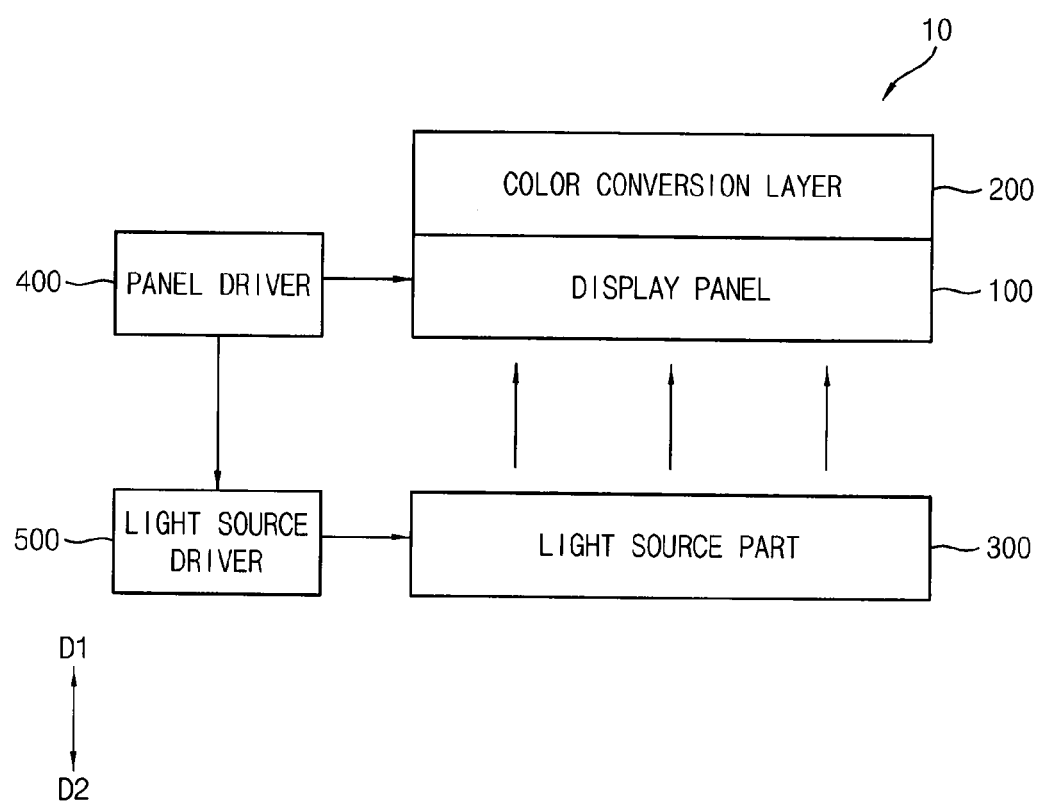
FIG. 1 is a block diagram illustrating an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 2:
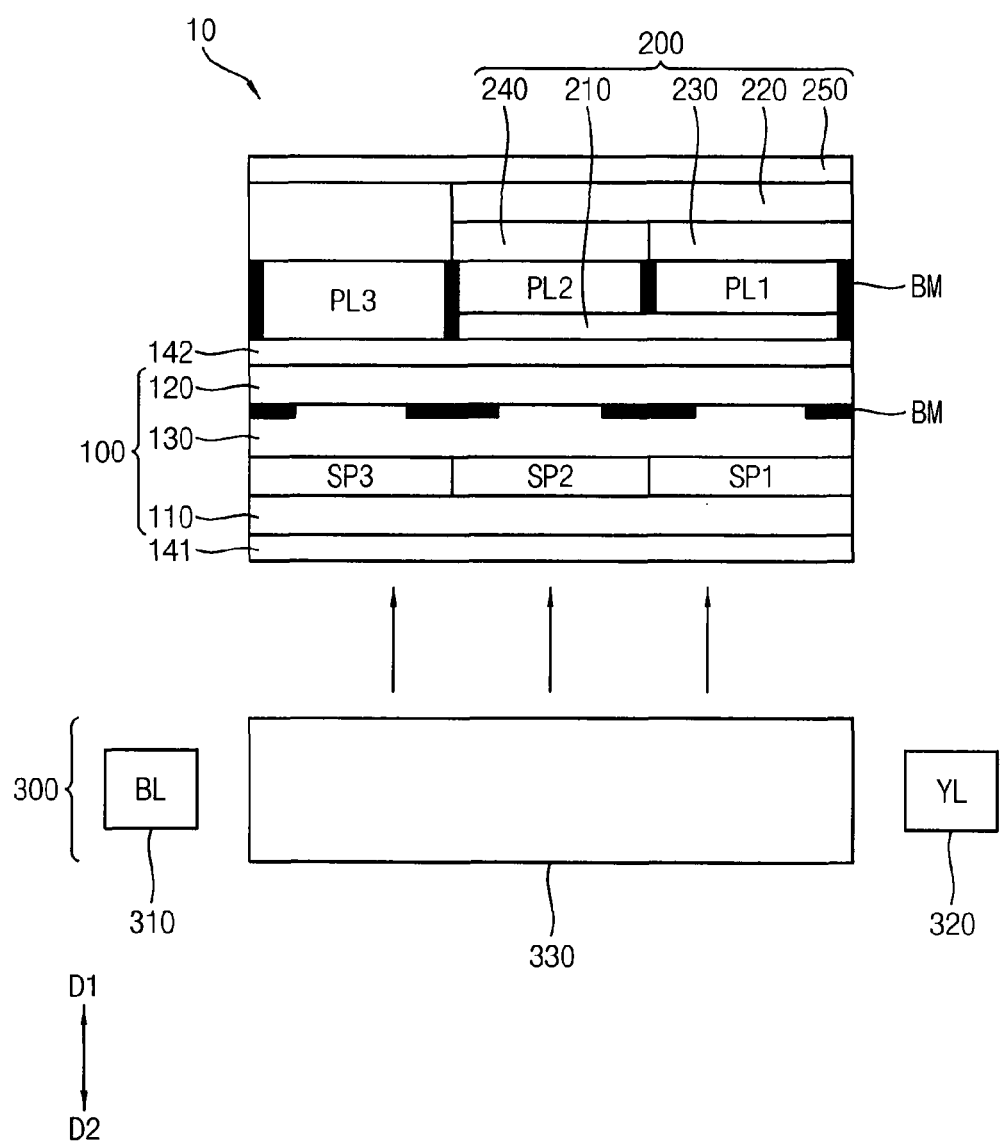
FIG. 2 is a cross-sectional view illustrating an exemplary embodiment of a display panel and a light source part of FIG. 1.

FIG. 1 is a block diagram illustrating an exemplary embodiment of a display apparatus according to the invention. FIG. 2 is a cross-sectional view illustrating an exemplary embodiment of a display panel and a light source part of FIG. 1.

Referring to FIGS. 1 and 2, an exemplary embodiment of the display apparatus 10 includes a display panel 100, a color conversion layer 200, a light source part 300, a panel driver 400 and a light source driver 500.

The display panel 100 displays an image. In an exemplary embodiment, as shown in FIG. 2, the display panel 100 includes a first substrate 110, a second substrate 120, a liquid crystal layer 130, a first polarizer 141 and a second polarizer 142.

The display panel 100 includes a first sub pixel SP1, a second sub pixel SP2 and a third sub pixel SP3. The first sub pixel SP1 may receive a first grayscale data from the panel driver 400. The second sub pixel SP2 may receive a second grayscale data from the panel driver 400. The third sub pixel SP3 may receive a third grayscale data from the panel driver 400.

The first grayscale data may include grayscale values corresponding to a first primary color. The second grayscale data may include grayscale values corresponding to a second primary color. The third grayscale data may include grayscale values corresponding to a third primary color.

In an exemplary embodiment, the first primary color may be red, and the first sub pixel SP1 may be a red sub pixel SP1. In such an embodiment, the second primary color may be green, and the second sub pixel SP2 may be a green sub pixel SP2. In such an embodiment, the third primary color may be blue.

The first substrate 110 may be a thin film transistor ("TFT") substrate including a plurality of TFTs. The first substrate 110 may further include a plurality of gate lines and a plurality of data lines crossing the gate lines. The first substrate 110 may further include a pixel electrode.

The first sub pixel SP1 is disposed on the first substrate 110 and may be defined by a pixel electrode that receives the first grayscale data. The second sub pixel SP2 is disposed on the first substrate 110 and may be defined by a pixel electrode that receives the second grayscale data. The third sub pixel SP3 is disposed on the first substrate 110 and may be defined by a pixel electrode that receives the third grayscale data.

The second substrate 120 is disposed to face the first substrate 110. The second substrate 120 may further include a common electrode.

A light blocking pattern BM may be disposed on the second substrate 120.

The liquid crystal layer 130 is disposed between the first and second substrates 110 and 120.

The panel driver 400 is connected to the display panel 100 and drives the display panel 100. The panel driver 400 may include a timing controller, a gate driver and a data driver.

The timing controller generates a first control signal that controls a driving timing of the gate driver, and outputs the first control signal to the gate driver. The timing controller generates a second control signal that controls a driving timing of the data driver, and outputs the second control signal to the data driver. The timing controller generates a data signal based on an input image data and outputs the data signal to the data driver. The gate driver outputs a gate signal to the gate lines.

The panel driver 400 sets the first grayscale data applied to the first sub pixel SP1, the second grayscale data applied to the second sub pixel SP2 and the third grayscale data applied to the third sub pixel SP3. The panel driver 300 outputs the first to third grayscale data to the display panel 100.

The panel driver 400 generates a light source control signal that controls a driving timing of the light source driver 500, and outputs the light source control signal to the light source driver 500. The panel driver 400 may be substantially synchronized with the light source driver 500.

The light source part 300 includes a first light source 310 and a second light source 320, which have colors different from each other. The light source part 300 may further include a light guide plate 330. The light source part 300 generates light and provides the light to the display panel 100.

The first light source 310 may emit first light having a blue color. The second light source 320 may emit second light having a yellow color such as a mixed color of a red color and a green color. When the first light and the second light are mixed with one another, the mixed color is white.

In an exemplary embodiment, the first light source 310 may be a light emitting diode ("LED") chip which emits blue light. The second light source 320 may be a LED chip which emits yellow light. The light guide plate 330 guides the light from the first and second light sources 310 and 320 to the display panel 100.

In an exemplary embodiment, the first light source 310 may be disposed to face a first side of the light guide plate 330, and the second light source 320 may be disposed to face a second side of the light guide plate 330 opposite to the first side of the light guide plate 330.

Alternatively, the first and second light sources 310 and 320 may be disposed to face the first side.

In one exemplary embodiment, for example, the first light source 310 and the second light source 320 may be stacked to face the first side of the light guide plate 330. In one exemplary embodiment, for example, the first light source 310 is disposed in a first layer to face the first side of the light guide plate 330, and the second light source 310 is disposed in a second layer on the first layer to face the first side of the light guide plate 330. In one exemplary embodiment, for example, the first and second light sources 310 and 320 may be alternately disposed in the same layer. In one exemplary embodiment, for example, the first and second light sources 310 and 320 may be alternately disposed in a first layer, and the first and second light sources 310 and 320 may be alternately disposed in a second layer on the first layer. In such an embodiment, the second light source 320 on the second layer may be disposed on the first light source 310 in the first layer, and the first light source 310 in the second layer may be disposed on the second light source 320 in the first layer.

In an exemplary embodiment, the first light source 310 emits the first light having a blue color (e.g., BL) and the second light source 320 emits the second light having a yellow color (e.g., YL), but the invention is not limited thereto. In another exemplary embodiment, the first light emitted by the first light source 310 may be a mixed light of blue light and ultra violet light. In another exemplary embodiment, the second light emitted by the second light source 320 may have one of a green color, a cyan color and a white color.

In an exemplary embodiment, the light source part 300 is an edge type light source part including the light guide plate 330 and the first and second light sources 310 and 320 disposed near side portions of the light guide plate 330, but the invention is not limited thereto. In another exemplary embodiment, the light source part 300 may be a direct type light source part including a plurality of light sources disposed under the display panel 100 and overlapping an entire area of the display panel 100.

In an exemplary embodiment, the display apparatus 10 is the liquid crystal display apparatus including the liquid crystal layer 130, but the invention is not limited thereto. In another exemplary embodiment, the display apparatus may be an organic light emitting diode ("OLED") display apparatus including the OLEDs.

In an exemplary embodiment, the light source driver 500 is connected to the light source part 300. The light source driver 500 drives the light source part 300. The light source driver 500 repeatedly turns on and off at least one of the first and second light sources 310 and 320.

In an exemplary embodiment, the light source driver 500 may alternately turn on the first and second light sources 310 and 320. In one exemplary embodiment, for example, the first light source 310 is turned on during a first sub frame, and the second light source 320 is turned off during the first sub frame. In such an embodiment, the first light source 310 is turned off during a second sub frame, and the second light source 320 is turned on during the second sub frame. Alternatively, the first and second light sources 310 and 320 may be turned off during the second sub frame.

The first polarizer may be disposed between the first substrate 110 and the light source part 300. The first polarizer may polarize light emitted by the light source part 300.

The second polarizer may be disposed between the second substrate 120 and the color conversion layer 200. The second polarizer may polarize light that has passed through the second substrate.

The color conversion layer 200 may include a first photoluminescence part PL1, a second photoluminescence part PL2, a third photoluminescence part PL3, a band pass filter 210, a light recycling layer 220, a first color filter 230, a second color filter 240 and a protecting layer 250. The color conversion layer 200 may be disposed on the display panel 100.

The first photoluminescence part PL1, the second photoluminescence part PL2 and the third photoluminescence part PL3 may emit light based on photoluminescence when receiving light in a specific wavelength range. When a particular substance is stimulated by light, the substance may emit excitation light. This phenomenon is called photoluminescence, and examples of photoluminescence include fluorescence and phosphorescence. The term "luminescence" denotes a phenomenon in which a state of substance changes into an excitation state by absorbing energy, e.g., light, electricity and/or radiation, and returns to a ground state by emitting the absorbed energy in the form of light. In order to emit light by photostimulation, light may be irradiated to a phosphor within a predetermined or given wavelength range so that the light may be absorbed by the phosphor. The phosphor may emit excitation light having a wavelength equal to or greater than a wavelength of the irradiated light. Visible light (excitation light) may be obtained using a blue laser beam having a short wavelength.

In an exemplary embodiment, excitation light such as red and blue light may be obtained using blue light.

In an exemplary embodiment, the first photoluminescence part PL1 may be excited by the first light emitted by the first light source 310 and emit a first excitation light having a first primary color. In one exemplary embodiment, for example, the first photoluminescence part PL1 may include a red phosphor or a red quantum dot which are excited by blue light and emit red light. The first photoluminescence part PL1 may be overlapped with the first sub pixel SP1.

In such an embodiment, the second photoluminescence part PL2 may be excited by the first light emitted by the first light source 310 and emit a second excitation light having a second primary color. In one exemplary embodiment, for example, the second photoluminescence part PL2 may include a green phosphor or a green quantum dot which are excited by blue light and emit green light. The second photoluminescence part PL2 may be overlapped with the second sub pixel SP2.

In such an embodiment, the third photoluminescence part PL3 may be excited by the first light emitted by the first light source 310 and emit a third excitation light having a third primary color. In one exemplary embodiment, for example, the third photoluminescence part PL3 may include a blue phosphor or a blue quantum dot which are excited by blue light and emit blue light. Alternatively, the third photoluminescence part PL3 may include a diffusion member that diffuses the blue light, such that the first light emitted by the first light source 310 may pass through the third photoluminescence part PL3 without photoluminescence. The third photoluminescence part PL3 may overlap the third sub pixel SP3.

In an exemplary embodiment, the light blocking pattern BM, such as a black matrix, may be disposed between the photoluminescence parts, such that contrast property may be improved.

The first photoluminescence part PL1, the second photoluminescence part PL2 and the third photoluminescence part PL3 will be described later in greater detail referring to FIGS. 3A and 3B.

The band pass filter 210 may be disposed on the first photoluminescence part PL1 and the second photoluminescence part PL2 in a second direction D2 opposite to a first direction D1. The band pass filter 210 may overlap the first photoluminescence part PL1 and the second photoluminescence part PL2. The band pass filter 210 may reflect light in a predetermined or specific wavelength range in the first direction D1. In one exemplary embodiment, for example, the band pass filter 210 may reflect light having the first primary color and light having the second primary color. Thus, in such an embodiment, the band pass filter 210 may transmit blue light and yellow light, and reflect red light and green light in the first direction D1. Thus, amount of light emitted from the first and second photoluminescence parts PL1 and PL2 to the first direction D1 may increase.

The light source part 300 emits the light in the first direction D1 toward the display panel 100.

The light recycling layer 220 may be disposed on the first photoluminescence part PL1 and the second photoluminescence part PL2 in the first direction D1, that is, above the first photoluminescence part PL1 and the second photoluminescence part PL2. The light recycling layer 220 may overlap the first photoluminescence part PL1 and the second photoluminescence part PL2. The light recycling layer 220 may reflect blue light not converted by the first photoluminescence part PL1 and the second photoluminescence part PL2, to the second direction D2. Thus, a color converting efficiency of the first photoluminescence part PL1 and the second photoluminescence part PL2 may increase.

The first color filter 230 may be disposed on the first photoluminescence part PL1 in the first direction D1. The first color filter 230 may be disposed between the first photoluminescence part PL1 and the light recycling layer 220. Alternatively, the first color filter 230 may be disposed on the light recycling layer 220 in the first direction D1. The first color filter 230 may include a color filter having the first primary color. In one exemplary embodiment, for example, the first color filter 230 may be a red color filter.

The first color filter 230 may effectively prevent the first photoluminescence part PL1 from being excited by blue light of ambient light to emit light. The first color filter 230 may transmit the red light of the second light and block green light of the second light.

The second color filter 240 may be disposed on the second photoluminescence part PL2 in the first direction D1. The second color filter 240 may be disposed between the second photoluminescence part PL2 and the light recycling layer 220. Alternatively, the second color filter 240 may be disposed on the light recycling layer 220 in the first direction D1. The second color filter 240 may include a color filter having the second primary color. In one exemplary embodiment, for example, the second color filter 240 may be a green color filter.

The second color filter 240 may effectively prevent the second photoluminescence part PL2 from being excited by blue light of ambient light to emit light. The second color filter 240 may transmit the green light of the second light and block red light of the second light.

In an alternative exemplary embodiment, the first color filter 230 and the second color filter 240 may be omitted.

The protecting layer 250 may be disposed on an outer surface of the color conversion layer 200. The protecting layer 250 may protect the color conversion layer. The protection layer 250 may include a transparent material such as a glass or a plastic, and may have a form of a substrate or a film.

Figure 3A:
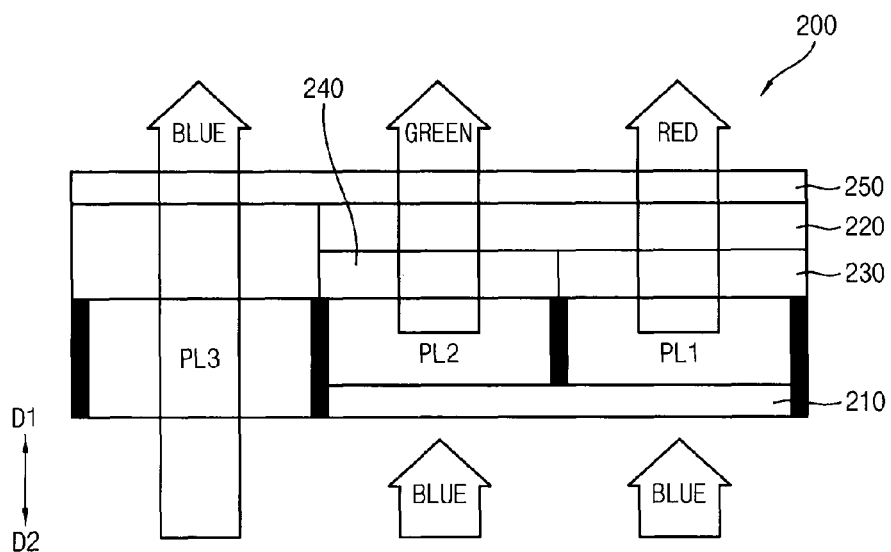
FIGS. 3A and 3B are cross-sectional views illustrating an exemplary embodiment of a color conversion layer of FIG. 1.
Figure 3B:
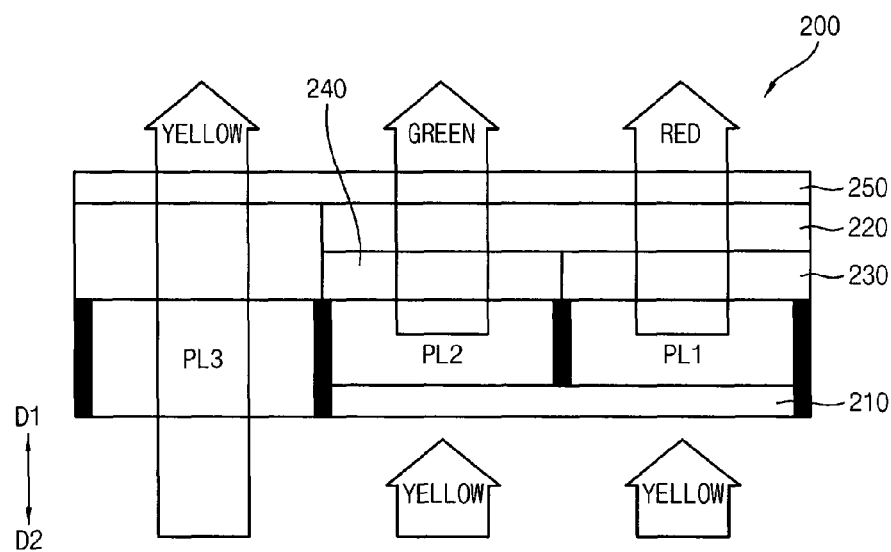

FIGS. 3A and 3B are cross-sectional views illustrating an exemplary embodiment of a color conversion layer of FIG. 1.

Referring to FIGS. 1 to 3A, in an exemplary embodiment, blue light may be incident into the color conversion layer 200.

The blue light that has passed through the band pass filter 210 is incident into the first photoluminescence part PL1. The first photoluminescence part PL1 may be excited by the blue light and emit red light in the first direction D1. The red light emitted by the first photoluminescence part PL1 may not pass the band pass filter 210, and the red light may be reflected in the first direction D1. The blue light, which is not converted by the first photoluminescence part PL1, may not pass the first color filter 230 and the light recycling layer 220, such that the blue light not converted by the first photoluminescence part PL1 may be reflected in the second direction D2. Thus, the color converting efficiency may increase.

The blue light that has passed through the band pass filter 210 is incident into the second photoluminescence part PL2. The second photoluminescence part PL2 may be excited by the blue light and emit green light in the first direction D1. The green light emitted by the second photoluminescence part PL2 may not pass the band pass filter 210, and the green light may be reflected in the first direction. The blue light, which is not converted by the second photoluminescence part PL2, may not pass the second color filter 240 and the light recycling layer 220, such that the blue light not converted by the second photoluminescence part PL2 may be reflected in the second direction D1. Thus, the color converting efficiency may increase.

The blue light incident into the third photoluminescence part PL3 may pass through the third photoluminescence part PL3 and emitted in the first direction D1.

Referring to FIGS. 1, 2 and 3B, in such an embodiment, yellow light may be incident into the color conversion layer 200.

The yellow light that has passed through the band pass filter 210 is incident into the first photoluminescence part PL1. The first photoluminescence part PL1 may not be excited by the yellow light. The yellow light includes red light and green light. The red light of the yellow light may pass through the first color filter 230 and the light recycling layer 200, such that the red light may be emitted in the first direction D1. The green light of the yellow light may not pass through the first color filter 230. Thus, the first photoluminescence part PL1 may emit the red light by the yellow light in the first direction D1.

The yellow light that has passed through the band pass filter 210 is incident into the second photoluminescence part PL2. The second photoluminescence part PL2 may not be excited by the yellow light. The yellow light includes the red light and the green light. The green light of the yellow light may pass through the second color filter 240 and the light recycling layer 200, such that the green light may be emitted in the first direction D1. The red light of the yellow light may not pass through the second color filter 240. Thus, the second photoluminescence part PL2 may emit the green light by the yellow light in the first direction D1.

The yellow light incident into the third photoluminescence part PL3 may pass through the third photoluminescence part PL3 and emitted in the first direction D1.

Figure 4:
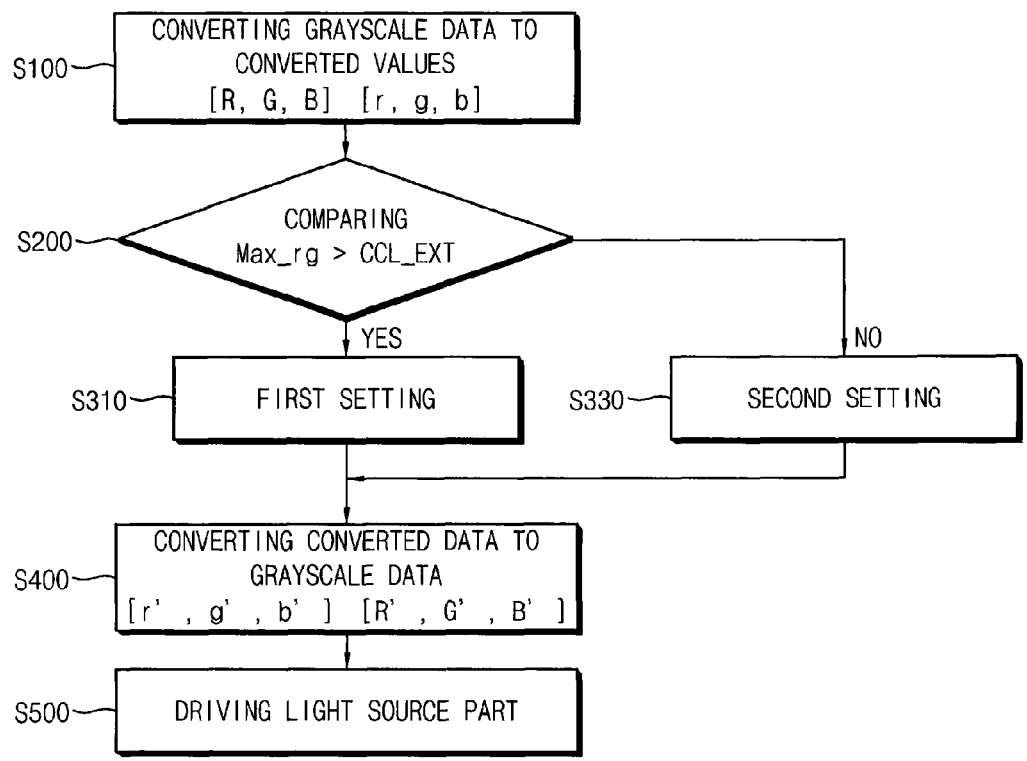
FIG. 4 is a flowchart illustrating an exemplary embodiment of a driving process of the display apparatus of FIG. 1.
Figure 5:
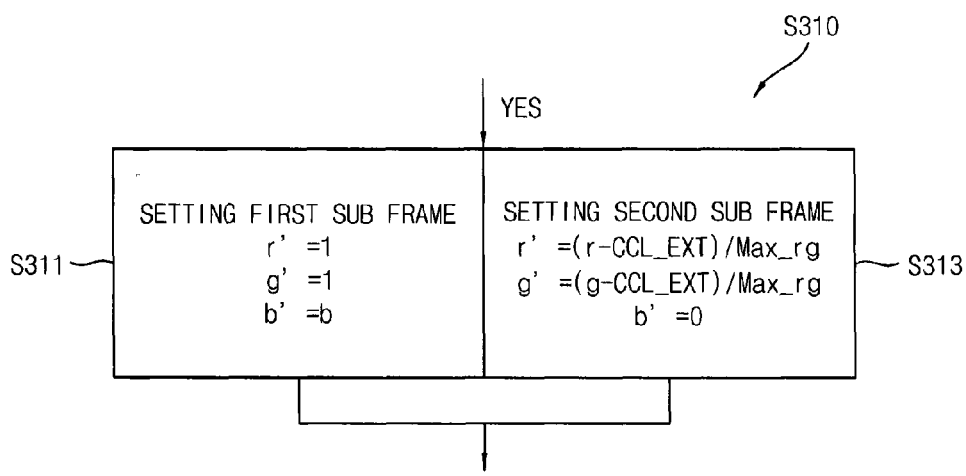
FIG. 5 is a flowchart illustrating an exemplary embodiment of a first setting of FIG. 4.
Figure 6:
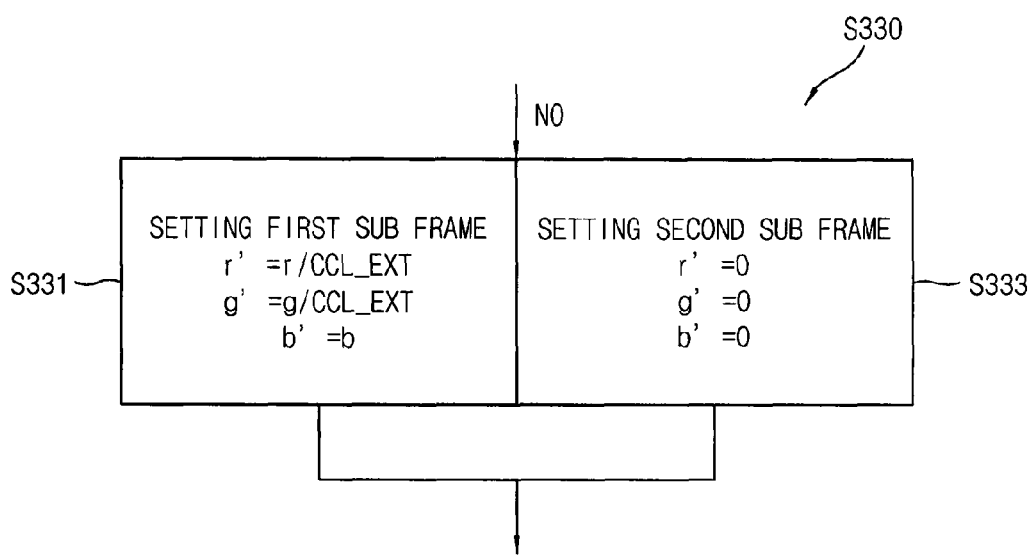
FIG. 6 is a flowchart illustrating an exemplary embodiment of a second setting of FIG. 4.

FIG. 4 is a flowchart illustrating an exemplary embodiment of a driving process of the display apparatus of FIG. 1. FIG. 5 is a flowchart illustrating an exemplary embodiment of a first setting of FIG. 4. FIG. 6 is a flowchart illustrating an exemplary embodiment of a second setting of FIG. 4.

Referring to FIGS. 1, 2 and 4 to 7, an exemplary embodiment of a method of driving the display apparatus includes converting grayscale data to converted values S100, comparing a first maximum value and an external quantum efficiency S200, performing a first setting S310, performing a second setting S330, converting converted data based on the first or second setting to grayscale data S400, and driving a light source part S500.

In the process of the converting the grayscale data to the converted values S100, the first grayscale data R to be applied to the first sub pixel SP1, the second grayscale data G to be applied to the second sub pixel SP2 and the third grayscale data B to be applied to the third sub pixel SP3 may be converted to a first converted value r, a second converted value g, and a third converted value b, respectively.

The first converted value r may be determined by the following equation: r=(a value of the first grayscale data R/the maximum grayscale value)$^{2.2}$, the second converted value g may be determined by the following equation: g=(a value of the second grayscale data G/the maximum grayscale value)$^{2.2}$, and the third converted value b may be determined by the following equation: b=(a value of the third grayscale data B/the maximum grayscale value)$^{2.2}$. The first converted value r, the second converted value g and the third converted value b may be greater than or equal to zero (0) and less than or equal to 1. Herein, the maximum grayscale value means the maximum value of a grayscale data, which is in a predetermined range, e.g., in a range from zero (0) to 1.

In the process of the comparing the first maximum value and the external quantum efficiency S200, a first maximum value Max_rg of a frame may be compared with an external quantum efficiency CCL_EXT of the color conversion layer 200.

The first maximum value Max_rg of a frame may be a maximum value of the first converted values r of the first grayscale data R applied to the entire first sub pixels and the second converted values g of the second grayscale data G applied to the entire second sub pixels during the frame.

The external quantum efficiency CCL_EXT may be determined based on a ratio of a quantity of photons supplied to the color conversion layer 200 to a quantity of photons emitted from the color conversion layer 200. In one exemplary embodiment, for example, the external quantum efficiency CCL_EXT may be determined by dividing the quantity of photons emitted from the color conversion layer 200 by the quantity of photons supplied to the color conversion layer 200. The external quantum efficiency CCL_EXT may be greater than or equal to zero (0) and less than or equal to 1.

When the first maximum value Max_rg of a frame is greater than the external quantum efficiency CCL_EXT, the first setting S310 may be performed subsequent thereto. When the first maximum value Max_rg of a frame is less than or equal to the external quantum efficiency CCL_EXT, the second setting S320 may be performed subsequent thereto.

The first setting S310 may include setting a first sub frame S311 corresponding to the first sub frame of the frame, and setting a second sub frame S313 corresponding to the second sub frame of the frame.

A first converted data r' corresponds to the first converted value r. A second converted data g' corresponds to the second converted value g. A third converted data b' corresponds to the third converted value b.

In the process of the setting the first sub frame S311, the first converted data r' and the second converted data g' may have a value corresponding to the maximum grayscale value, and the third converted data b' may have the third converted data b. In one exemplary embodiment, for example, the maximum grayscale value may be '1'.

In the process of the setting the second sub frame S313, the first converted data r' may be determined by the following Equation 1, the second converted data g' may be determined by the following Equation 2, and the third converted data b' may have a value corresponding to a minimum grayscale value. In one exemplary embodiment, for example, the minimum grayscale value may be '0'.

$$r' = \frac{(r - CCL\_EXT)}{Max\_rg} \quad \text{Equation 1}$$

$$g' = \frac{(g - CCL\_EXT)}{Max\_rg} \quad \text{Equation 2}$$

The process of the second setting may include setting a first sub frame S331 corresponding to the first sub frame, and setting a second sub frame S333 corresponding to the second sub frame.

In the process of the setting the first sub frame S331, the first converted data r' may be determined by the following Equation 3, the second converted data g' may be determined by the following Equation 4, and the third converted data b' may have the third converted data b.

$$r' = \frac{r}{CCL\_EXT} \quad \text{Equation 3}$$

$$g' = \frac{g}{CCL\_EXT} \quad \text{Equation 4}$$

In the process of the setting the second sub frame S333, the first converted data r', the second converted data g' and the third converted data b' may have a value corresponding to the minimum grayscale value. The setting the second sub frame S333 may correspond to a period during which the second light source is turned off. Thus, in an exemplary embodiment, the setting the second sub frame S333 may be omitted.

In the process of the converting the converted data to the grayscale data S400, the first converted data r', the second converted data g' and the third converted data b' may be converted to a first compensated grayscale data R', a second compensated grayscale data G' and a third compensated grayscale data B', respectively. The converting the converted data to the grayscale data S400 may be a reverse conversion of the converting the grayscale data to the converted values S100.

The process of the driving the light source part S500 may include turning on the first light source 310 during the first sub frame, and turning on the second light source 320 during the second sub frame when the first maximum value Max_rg is greater than the external quantum efficiency CCL_EXT, and turning off the second light source 320 during the second sub frame when the first maximum value Max_rg is less than or equal to the external quantum efficiency CCL_EXT.

Each of the process after the comparing the first maximum value and the external quantum efficiency S200 is shown by a single block in FIG. 4 for convenience of illustration.

The process S100 and the process S200 may be performed simultaneously during a same single frame. Thus, the processes after the process S200 may be connected with the process of the first setting S310 when the first maximum value Max_rg is greater than the external quantum efficiency CCL_EXT, and be connected with the process of the second setting S330 when the first maximum value Max_rg is less than or equal to the external quantum efficiency CCL_EXT.

In one exemplary embodiment, for example, when the first maximum value Max_rg is greater than the external quantum efficiency CCL_EXT, the method of driving the display apparatus may include, during the first sub frame, preforming the setting the first sub frame S311 of the first setting S310, the converting the converted data to the grayscale data S400 and the turning on the first light source 310 in the driving the light source part S500. The method of driving the display apparatus may include, during the second sub frame, preforming the setting the second sub frame S313 of the first setting S310, the converting the converted data to the grayscale data S400 and the turning on the second light source 320 in the driving the light source part S500.

The processes of the first setting S310 and the second setting S330 in an exemplary embodiment will now be described in greater detail. When the first maximum value Max_rg is greater than the external quantum efficiency CCL_EXT, the maximum grayscale value may be applied to the first sub pixel SP1 and the second sub pixel SP2 during the first sub frame, and the third grayscale data B may be applied to the third sub pixel SP3 during the first sub frame. When the first maximum value Max_rg is less than or equal to the external quantum efficiency CCL_EXT, a grayscale value, which corresponds to the first converted value r divided by the external quantum efficiency CCL_EXT, may be applied to the first sub pixel SP1 during the first sub frame, a grayscale value, which corresponds to the second converted value g divided by the external quantum efficiency CCL_EXT, may be applied to the second sub pixel SP2 during the first sub frame, and the third grayscale data B may be applied to the third sub pixel SP3 during the first sub frame. In such an embodiment, when the first maximum value Max_rg is greater than the external quantum efficiency CCL_EXT, a grayscale value, which corresponds to r' of Equation 1, may be applied to the first sub pixel SP1 during the second sub frame, a grayscale value, which corresponds to g' of Equation 2, may be applied to the second sub pixel SP2 during the second sub frame, and a minimum grayscale value may be applied to the third sub pixel SP3 during the second sub frame. When the first maximum value Max_rg is less than or equal to the external quantum efficiency CCL_EXT, the minimum grayscale value may be applied to the first sub pixel SP1, the second sub pixel SP2 and the third sub pixel SP3 during the second sub frame.

Figure 7A:
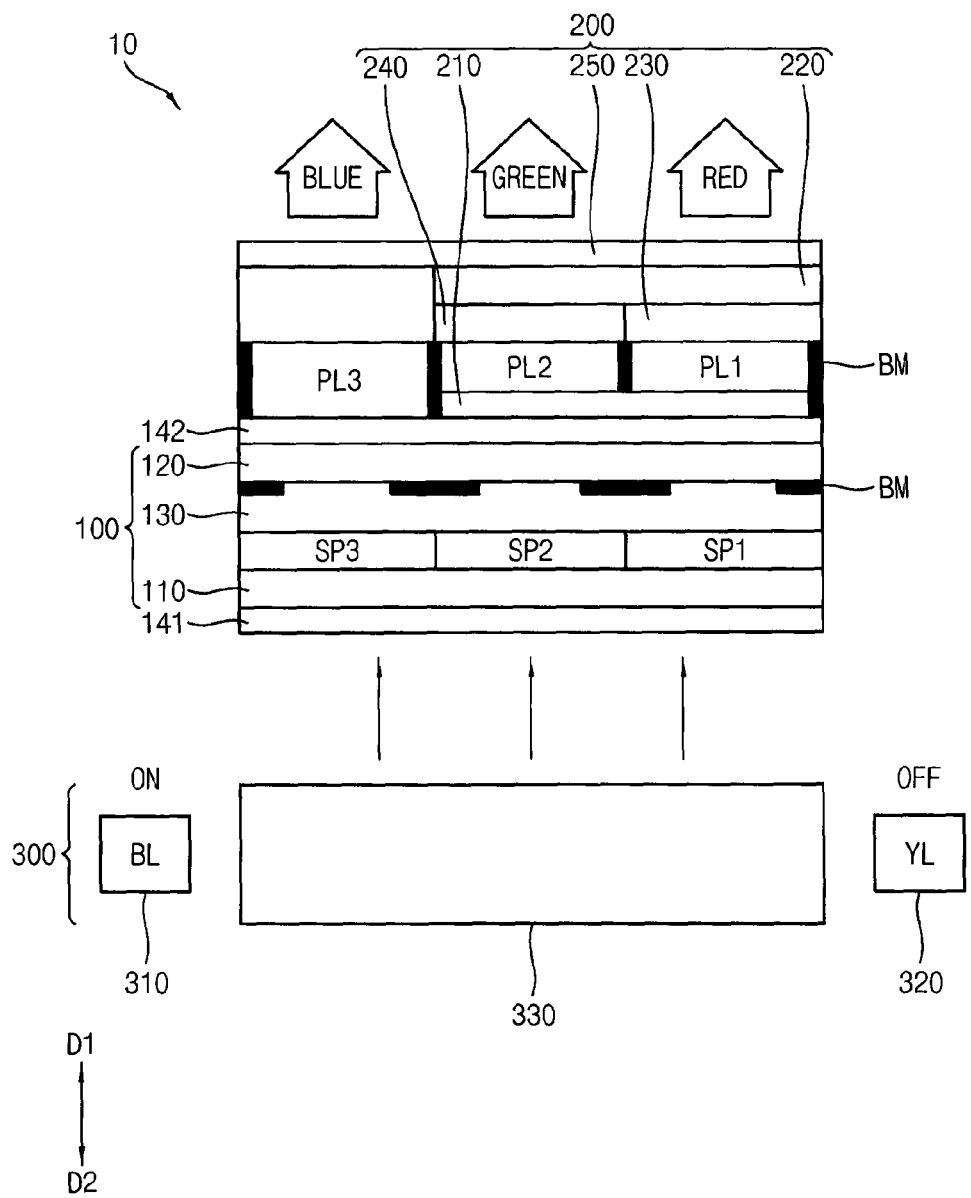
FIG. 7A is a cross-sectional view illustrating an exemplary embodiment of the display panel and the light source part in a first sub frame.
Figure 7B:
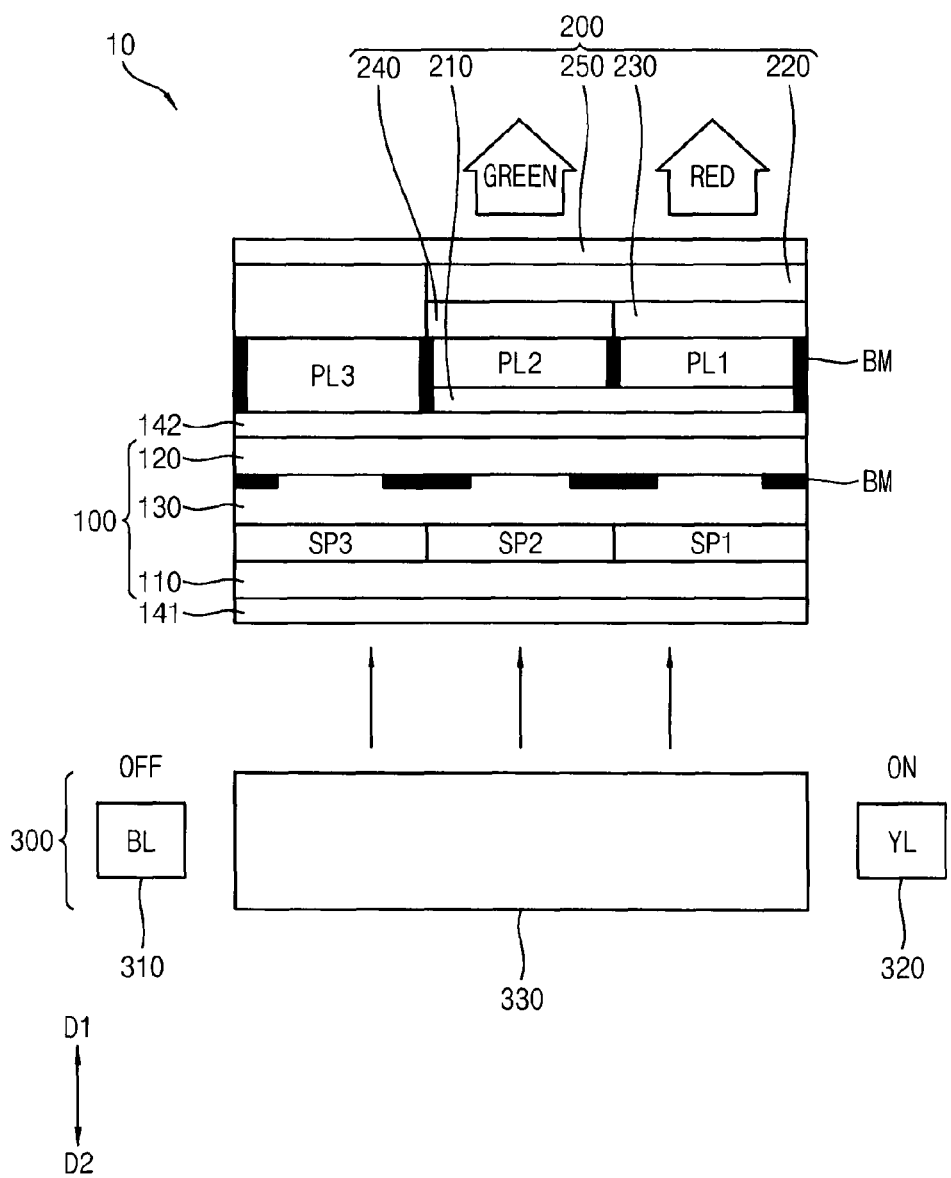
FIG. 7B is a cross-sectional view illustrating an exemplary embodiment of the display panel and the light source part in a second sub frame.

FIG. 7A is a cross-sectional view illustrating an exemplary embodiment of the display panel and the light source part in a first sub frame. FIG. 7B is a cross-sectional view illustrating an exemplary embodiment of the display panel and the light source part in a second sub frame. FIGS. 7A and 7B shows an exemplary embodiment of the display apparatus 10 in a first sub frame and a second sub frame when the first maximum value Max_rg is greater than the external quantum efficiency CCL_EXT.

An operation of an exemplary embodiment of the display apparatus 10 in the first sub frame when the first maximum value Max_rg is greater than the external quantum efficiency CCL_EXT, will be described in detail referring to FIGS. 1 to 7A.

The first sub pixel SP1 and the second sub pixel SP2 may receive a maximum grayscale value. The third sub pixel SP3 may receive the third grayscale data B.

The light source part 300 may turn on the first light source 310.

The first photoluminescence part PL1 may be excited by blue light emitted by the first light source 310, and emit red excitation light through the first color filter 230 and the light recycling layer 220.

The second photoluminescence part PL2 may be excited by blue light emitted by the first light source 310, and emit green excitation light through the second color filter 240 and the light recycling layer 220.

The third photoluminescence part PL3 may pass the blue light emitted by the first light source 310.

An operation of an exemplary embodiment of the display apparatus 10 in the second sub frame when the first maximum value Max_rg is greater than the external quantum efficiency CCL_EXT, will be described in detail referring to FIGS. 1 to 6 and 7B.

The first sub pixel SP1 may receive a grayscale value which corresponds to r' of Equation 1.

The second sub pixel SP2 may receive a grayscale value which corresponds to g' of Equation 2.

The third sub pixel SP3 may receive a minimum grayscale value.

The light source part 300 may turn on the second light source 320.

The first photoluminescence part PL1 may not be excited by yellow light emitted by the second light source 320. The yellow light includes red light and green light. The first photoluminescence part PL1 may emit the red light of the yellow light through the first color filter 230 and the light recycling layer 220.

The second photoluminescence part PL2 may not be excited by the yellow light emitted by the second light source 320. The second photoluminescence part PL2 may emit the green light of the yellow light through the second color filter 240 and the light recycling layer 220.

The third photoluminescence part PL3 may not receive the yellow light emitted by the second light source 320. Thus, the third photoluminescence part PL3 may not emit light.

Figure 8A:
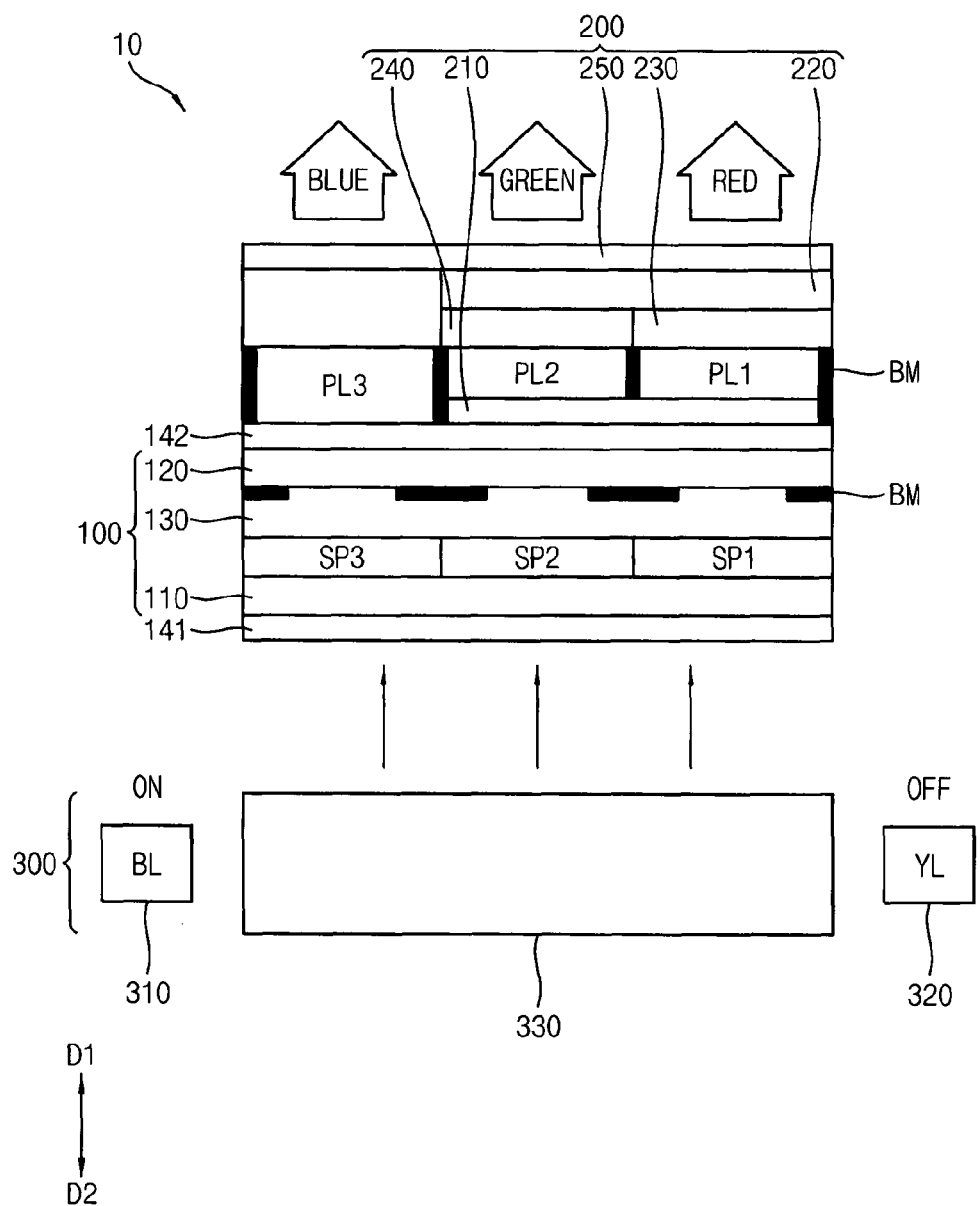
FIG. 8A is a cross-sectional view illustrating an exemplary embodiment of the display panel and the light source part in a first sub frame.
Figure 8B:
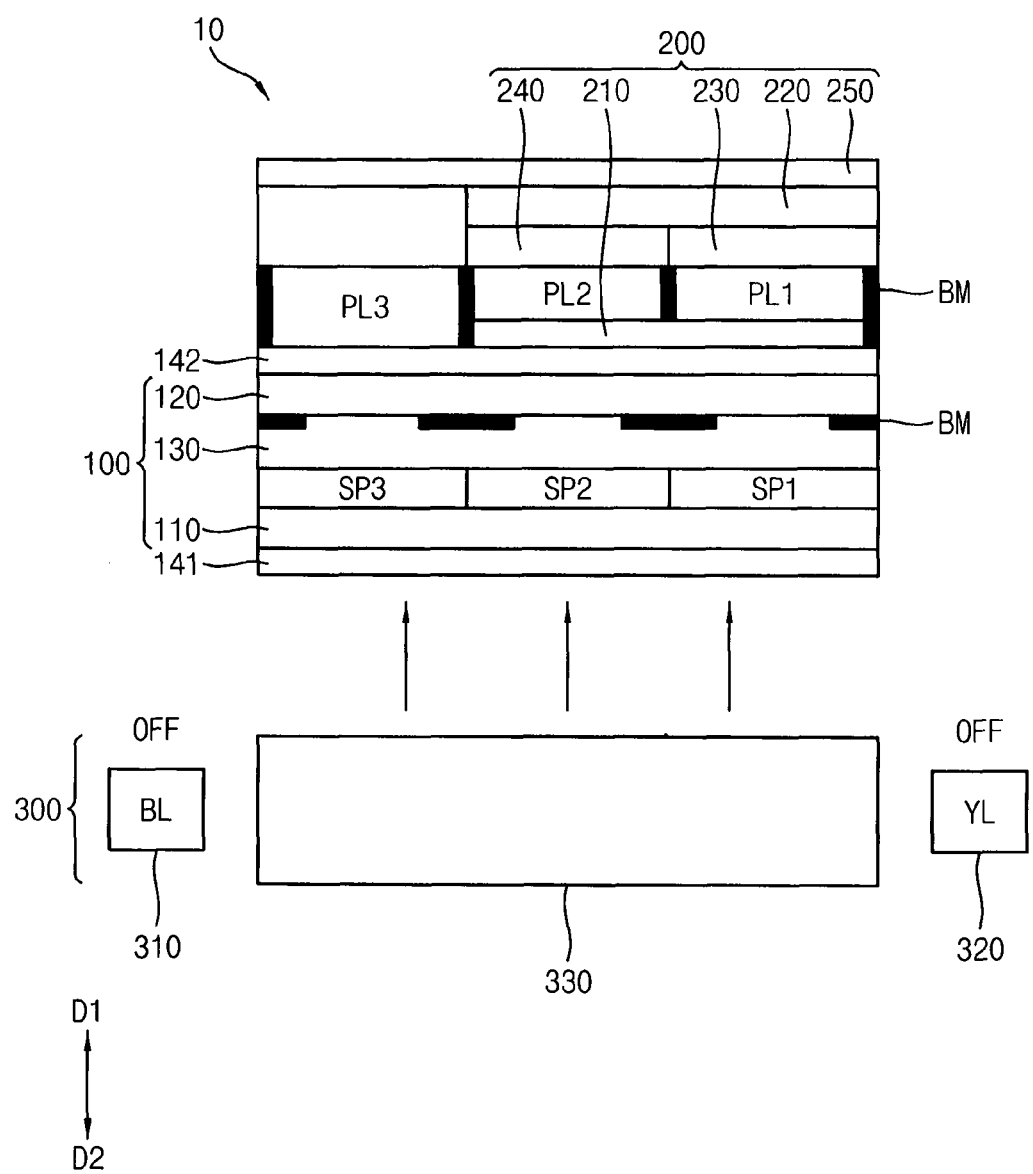
FIG. 8B is a cross-sectional view illustrating an exemplary embodiment of the display panel and the light source part in a second sub frame.

FIG. 8A is a cross-sectional view illustrating an exemplary embodiment of the display panel and the light source part in a first sub frame. FIG. 8B is a cross-sectional view illustrating an exemplary embodiment of the display panel and the light source part in a second sub frame. FIGS. 8A and 8B shows operations of an exemplary embodiment of the display apparatus 10 in a first sub frame and a second sub frame when the first maximum value Max_rg is less than or equal to the external quantum efficiency CCL_EXT.

An operation of an exemplary embodiment of the display apparatus 10 in the first sub frame when the first maximum value Max_rg is less than or equal to the external quantum efficiency CCL_EXT, will be described in detail referring to FIGS. 1 to 6 and 8A.

The first sub pixel SP1 may receive a grayscale which corresponds to the first converted value r divided by the external quantum efficiency CCL_EXT.

The second sub pixel SP2 may receive a grayscale which corresponds to the second converted value g divided by the external quantum efficiency CCL_EXT.

The third sub pixel SP3 may receive the third grayscale data B.

The light source part 300 may turn on the first light source 310.

The first photoluminescence part PL1 may be excited by blue light emitted by the first light source 310, and emit red excitation light through the first color filter 230 and the light recycling layer 220.

The second photoluminescence part PL2 may be excited by blue light emitted by the first light source 310, and emit green excitation light through the second color filter 240 and the light recycling layer 220.

The third photoluminescence part PL3 may pass the blue light emitted by the first light source 310.

An operation of an exemplary embodiment of the display apparatus 10 in the second sub frame when the first maximum value Max_rg is less than or equal to the external quantum efficiency CCL_EXT, will be described in detail referring to FIGS. 1 to 6 and 8B.

The first sub pixel SP1, the second sub pixel SP2 and the third sub pixel SP3 may receive a minimum grayscale value.

The light source part 300 may turn off the second light source 320. Thus, the first photoluminescence part PL1, the second photoluminescence part PL2 and the third photoluminescence part PL3 may not emit light.

Figure 9:
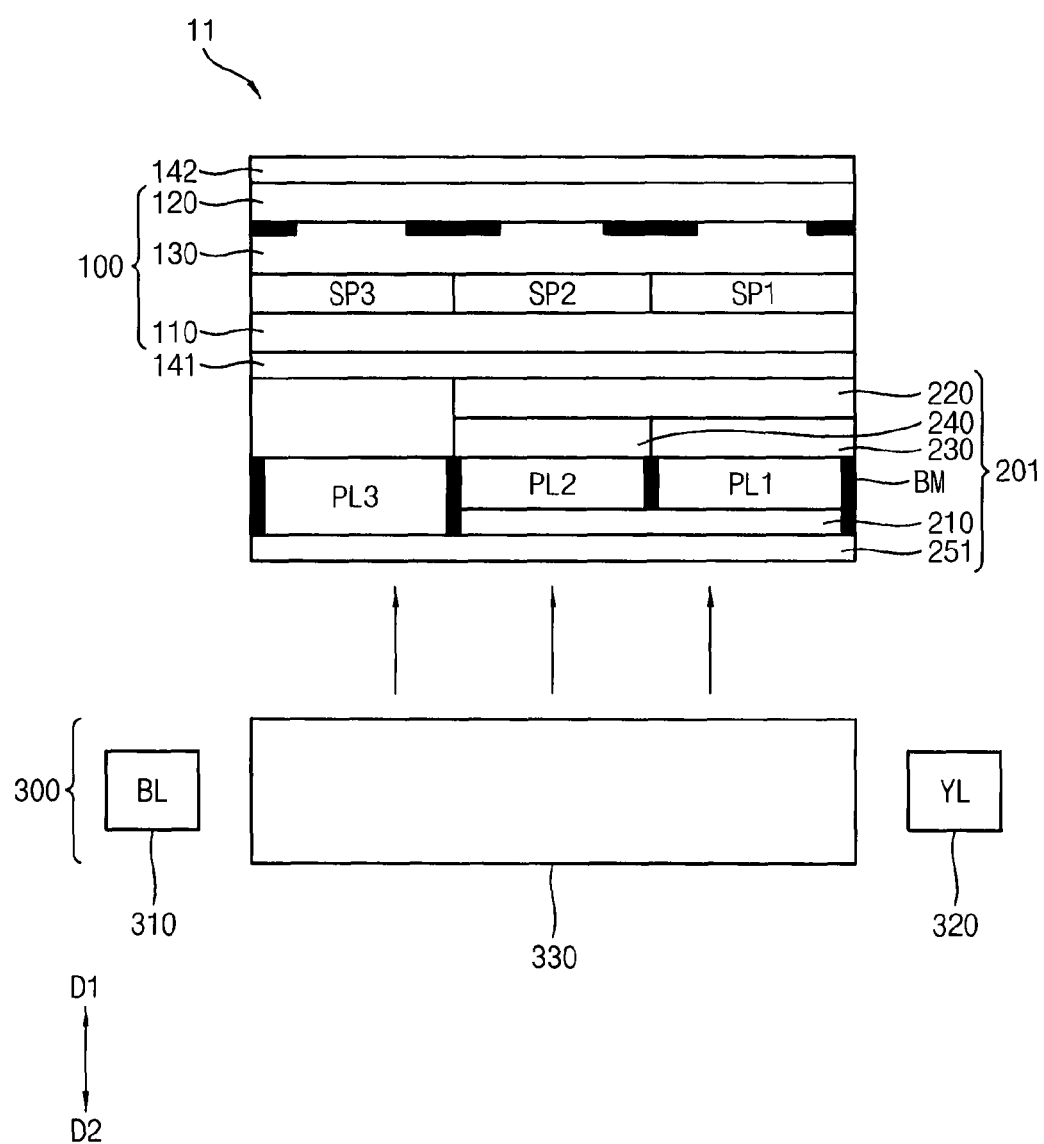
FIG. 9 is a cross-sectional view illustrating a display panel and a light source part of an alternative exemplary embodiment of a display apparatus according to the invention.

FIG. 9 is a cross-sectional view illustrating a display panel and a light source part of an alternative exemplary embodiment of a display apparatus according to the invention.

The display apparatus 11 shown in FIG. 9 is substantially the same as the display apparatus in FIGS. 1 and 2 except that a color conversion layer 201 is disposed between a display panel 100 and a light source part 300. The same or like elements shown in FIG. 9 have been labeled with the same reference characters as used above to describe the exemplary embodiments of display apparatus in FIGS. 1 and 2, and any repetitive detailed description thereof will hereinafter be omitted or simplified.

Referring to FIG. 9, an exemplary embodiment of the display apparatus 11 includes a display panel 100, a color conversion layer 201, a light source part 300, a panel driver 400 and a light source driver 500.

The color conversion layer 201 may include a first photoluminescence part PL1, a second photoluminescence part PL2, a third photoluminescence part PL3, a band pass filter 210, a light recycling layer 220, a first color filter 230, a second color filter 240 and a protecting layer 251. The color conversion layer 201 may be disposed under the display panel 100.

The protecting layer 251 may be disposed on a lower surface of the color conversion layer 200. The protecting layer 251 may protect the color conversion layer. The protection layer 251 may include a transparent material such as a glass or a plastic, and may be in a form of a substrate or a film.

According to exemplary embodiments of the invention, as described herein, the display apparatus may include the color conversion layer including the first photoluminescence part PL1, the second photoluminescence part PL2 and the third photoluminescence part PL3, and the light source part sequentially turn on the first light source and the second light source. Thus, the balance between colors and the display quality may be improved.

Exemplary embodiments of a display apparatus may be applied to a mobile type display such as a mobile phone, a note book computer and a tablet computer, a fixed type display such as a television and a desktop display, and a display of a general appliance such as a refrigerator, a washing machine and an air conditioner.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
    a display panel comprising:
        a first sub pixel configured to receive a first grayscale data;
        a second sub pixel configured to receive a second grayscale data; and
        a third sub pixel configured to receive a third grayscale data;
    a light source part configured to provide light to the display panel and to sequentially turn on a first light source and a second light source, wherein light source part comprises: the first light source configured to emit a first light; and the second light source configured to emit a second light having a color different from the first light; and
    a color conversion layer comprising:
        a first photoluminescence part which overlaps the first sub pixel and is excited by the first light to emit a first excitation light having a first primary color;
        a second photoluminescence part which overlaps the second sub pixel and is excited by the first light to emit a second excitation light having a second primary color; and
        a third photoluminescence part which overlaps the third sub pixel and is excited by the first light to emit a third excitation light having a third primary color,
    wherein
    a first maximum value of a frame is defined as the greater of
        a maximum value of a first converted value corresponding to the first grayscale data during the frame and a maximum value of a second converted value corresponding to the second grayscale data during the frame,
    when the first maximum value of the frame is greater than an external quantum efficiency of the color conversion layer, the light source part is configured to turn on the first light source during a first sub frame of the frame and to turn on the second light source during a second sub frame of the frame, and
    when the first maximum value of the frame is less than or equal to the external quantum efficiency, the light source part is configured to turn on the first light source during the first sub frame of the frame and to turn off the second light source during the second sub frame of the frame.

2. The display apparatus of claim 1, wherein
    the external quantum efficiency is determined based on a ratio of a quantity of photons supplied to the color conversion layer to a quantity of photons emitted from the color conversion layer,
    the first converted value is determined based on (a value of the first grayscale data/a maximum grayscale value)$^{2.2}$,
    the second converted value is determined based on (a value of the second grayscale data/the maximum grayscale value)$^{2.2}$, and
    a third converted value is determined based on (a value of the third grayscale data/the maximum grayscale value)$^{2.2}$.

3. The display apparatus of claim 1, wherein when the first maximum value of the frame is greater than the external quantum efficiency, the first sub pixel and the second sub pixel are configured to receive a maximum grayscale value during the first sub frame of the frame.

4. The display apparatus of claim 3, wherein
    when the first maximum value of the frame is greater than the external quantum efficiency, the first sub pixel is configured to receive a grayscale value corresponding to (the first converted value−the external quantum efficiency)/the first maximum value, during the second sub frame of the frame,
    when the first maximum value of the frame is greater than the external quantum efficiency, the second sub pixel is configured to receive a grayscale value corresponding to (the second converted value−the external quantum efficiency)/the first maximum value, during the second sub frame of the frame, and
    when the first maximum value of the frame is greater than the external quantum efficiency, the third sub pixel is configured to receive a minimum grayscale value, during the second sub frame of the frame.

5. The display apparatus of claim 1, wherein
    when the first maximum value of the frame is less than or equal to the external quantum efficiency, the first sub pixel is configured to receive a grayscale value corresponding to the first converted value divided by the external quantum efficiency, during the first sub frame of the frame, and
    when the first maximum value of the frame is less than or equal to the external quantum efficiency, the second sub pixel is configured to receive a grayscale value corresponding to the second converted value divided by the external quantum efficiency, during the first sub frame of the frame.

6. A display apparatus comprising:
    a display panal comprising;
        a first sub pixel configured to receive a first grayscale data;
        a second sub pixel configured to receive a second grayscale data; and
        a third sub pixel configured to receive a third grayscale data;
    a light source part configured to provide light to the display panel and to sequentially turn on a first light source and a second light source, wherein light source part comprises: the first light source configured to emit a first light, and the second light source configured to emit a second light having a color different from the first light; and a color conversion layer comprising:
  a first photoluminescence part which overlaps the first sub pixel and is excited by the first light to emit a first excitation light having a first primary color;
  a second photoluminescence part which overlaps the second sub pixel and is excited by the first light to emit a second excitation light having a second primary color, and
  a third photoluminescence part which overlaps the third sub pixel and is excited by the first light to emit a third excitation light having a third primary color, wherein the color conversion layer further comprises:
a light recycling layer disposed on the first photoluminescence part and the second photoluminescence part in a first direction, and configured to reflect the third excitation light in a second direction opposite to the first direction; and
a band pass filter disposed on the first photoluminescence part and the second photoluminescence part in the second direction, and configured to reflect the first excitation light and the second excitation light in the first direction.

7. The display apparatus of claim 6, wherein the color conversion layer further comprises:
  a first color filter disposed on the first photoluminescence part in the first direction, and having the first primary color; and
  a second color filter disposed on the second photoluminescence part in the first direction, and having the second primary color.

8. The display apparatus of claim 6, wherein the display panel is disposed between the color conversion layer and the light source part.

9. The display apparatus of claim 6, wherein the color conversion layer is disposed between the display panel and the light source part.

10. The display apparatus of claim 6, wherein
the first primary color is red,
the second primary color is green, and
the third primary color is blue.

11. The display apparatus of claim 10, wherein
the first light emitted by the first light source has the third primary color, and
the second light emitted by the second light source has a yellow color.

12. The display apparatus of claim 10, wherein
the first light emitted by the first light source comprises a mixed light of light having the third primary color and ultra violet light, and
the second light emitted by the second light source has a yellow color.

13. The display apparatus of claim 10, wherein
the first light emitted by the first light source has the third primary color, and
the second light emitted by the second light source has one of the second primary color, a cyan color and a white color.

14. A method of driving a display apparatus, the method comprising:
  converting a first grayscale data, a second grayscale data and a third grayscale data to a first converted value, a second converted value and a third converted value, respectively, wherein a first sub pixel of the display apparatus receives the first grayscale data, a second sub pixel of the display apparatus receives the second grayscale data, and a third sub pixel of the display apparatus receives the third grayscale data;
  comparing a first maximum value of a frame and an external quantum efficiency of a color conversion layer of the display apparatus, wherein the first maximum value of the frame is defined as the greater of a maximum value of the first converted value during the frame and a maximum value of the second converted value during the frame, and the color conversion layer is configured to emit excitation light;
  turning on a first light source of the display apparatus during a first sub frame of the frame, wherein the first light source is configured to emit a first light; and
  turning on a second light source of the display apparatus during a second sub frame of the frame when the first maximum value is greater than the external quantum efficiency, and turning off the second light source during the second sub frame of the frame when the first maximum value is less than or equal to the external quantum efficiency, wherein the second light source is configured to emit a second light having a color different from a color of the first light.

15. The method of claim 14, further comprising:
when the first maximum value of the frame is greater than the external quantum efficiency,
applying a maximum grayscale value to the first sub pixel and the second sub pixel during the first sub frame of the frame, and
applying the third grayscale data to the third sub pixel during the first sub frame of the frame; and
when the first maximum value of the frame is less than or equal to the external quantum efficiency,
applying a grayscale value corresponding to the first converted value divided by the external quantum efficiency, to the first sub pixel during the first sub frame of the frame,
applying a grayscale value corresponding to the second converted value divided by the external quantum efficiency, to the second sub pixel during the first sub frame of the frame, and
applying the third grayscale data to the third sub pixel during the first sub frame of the frame.

16. The method of claim 14, further comprising:
when the first maximum value of the frame is greater than the external quantum efficiency,
applying a grayscale value corresponding to (the first converted value−the external quantum efficiency)/the first maximum value, to the first sub pixel during the second sub frame of the frame,
applying a grayscale value corresponding to (the second converted value−the external quantum efficiency)/the first maximum value, to the second sub pixel during the second sub frame of the frame, and
applying a minimum grayscale value to the third sub pixel during the second sub frame of the frame; and
when the first maximum value of the frame is less than or equal to the external quantum efficiency,
applying the minimum grayscale value to the first sub pixel, the second sub pixel and the third sub pixel during the second sub frame of the frame.

17. The method of claim 14, wherein
the external quantum efficiency is determined based on a ratio of a quantity of photons supplied to the color conversion layer to a quantity of photons emitted from the color conversion layer, the first converted value is determined by (a value of the first grayscale data/a maximum grayscale value)$^{2.2}$, the second converted value is determined by (a value of the second grayscale data/the maximum grayscale value)$^{2.2}$, and a third converted value is determined by (a value of the third grayscale data/the maximum grayscale value)$^{2.2}$.

18. The method of claim 14, wherein the color conversion layer comprises:

a first photoluminescence part which overlaps the first sub pixel and is configured to be excited by the first light to emit a first excitation light having a first primary color;

a second photoluminescence part which overlap the second sub pixel and is configured to be excited by the first light to emit a second excitation light having a second primary color; and a third photoluminescence part which overlaps the third sub pixel and is configured to be excited by the first light to emit a third excitation light having a third primary color.

19. The method of claim 18, wherein the first primary color is red, the second primary color is green, the third primary color is blue, the first light emitted by the first light source has the third primary color, and the second light emitted by the second light source has a yellow color.

\* \* \* \* \*